US006766231B2

(12) United States Patent
Nakagawa et al.

(10) Patent No.: US 6,766,231 B2
(45) Date of Patent: Jul. 20, 2004

(54) MONITOR SYSTEM FOR WORK VEHICLE

(75) Inventors: Tomohiro Nakagawa, Osaka (JP); Shigeru Yamamoto, Osaka (JP); Kazuyuki Suzuki, Osaka (JP)

(73) Assignee: Komatsu Ltd. (JP)

(*) Notice: Subject to any disclaimer, the term of this patent is extended or adjusted under 35 U.S.C. 154(b) by 0 days.

(21) Appl. No.: 10/126,669

(22) Filed: Apr. 22, 2002

(65) Prior Publication Data

US 2002/0188425 A1 Dec. 12, 2002

(30) Foreign Application Priority Data

Apr. 23, 2001 (JP) .................................... P2001-124420

(51) Int. Cl.[7] .............................................. G06F 11/30
(52) U.S. Cl. ............................ 701/29; 701/50; 340/438
(58) Field of Search ............................ 701/29, 30, 115, 701/32, 50; 340/425.5, 438, 459, 461, 462; 702/182

(56) References Cited

U.S. PATENT DOCUMENTS 5,327,344 A 7/1994 Hoffman et al. .............. 701/32
5,345,383 A 9/1994 Vance .......................... 701/32
5,347,260 A 9/1994 Ginzel et al. ............... 340/438
5,361,059 A 11/1994 Hoffman et al. ............ 340/438
5,371,487 A 12/1994 Hoffman et al. ......... 340/425.5
5,374,917 A 12/1994 Hoffman et al. ............ 340/438
5,453,939 A 9/1995 Hoffman et al. ............ 702/183
5,648,898 A 7/1997 Moore-McKee et al. ..... 700/86
5,819,201 A * 10/1998 DeGraaf ..................... 701/208
5,949,330 A * 9/1999 Hoffman et al. ............ 340/438
6,212,483 B1 * 4/2001 Carew et al. ............... 702/183
6,320,497 B1 * 11/2001 Fukumoto et al. ....... 340/425.5
6,334,085 B1 * 12/2001 Kawamura et al. ......... 701/115

FOREIGN PATENT DOCUMENTS

JP 05-288782 11/1993
JP 06-024685 2/1994
JP 09-278361 10/1997

* cited by examiner

*Primary Examiner*—Marthe Y. Marc-Coleman
(74) *Attorney, Agent, or Firm*—Rader, Fishman & Grauer PLLC

(57) ABSTRACT

An object is to readily execute various adjustment and setting operations according to the taste of the operator, while various easy adjustment and setting operations are possible at the service side without use of a special input device. A display panel section for displaying various pieces of information on a work vehicle has a message display section which is switchable among a normal mode for displaying the normal operating condition of the work vehicle; a user mode for displaying, by switching, a plurality of functions selectable by an operator who operates the work vehicle; and a service mode for displaying, by switching, a plurality of functions selectable by an adjuster who is in charge of adjustment operation for the work vehicle.

7 Claims, 13 Drawing Sheets

(a)

(b)

(a)

(b)

MONITOR SYSTEM FOR WORK VEHICLE

TECHNICAL FIELD

The present invention relates to a monitor system for a work vehicle and more particularly to a monitor system well suited for use in construction machinery such as bulldozers.

BACKGROUND ART

A known construction machine vehicle such as bulldozers requires a system which enables alternation of the vehicle body performance of each individual vehicle according to its operating site. Concretely, the alternation includes: alternation of various control parameters; adjustment of variations in braking and clutching; and alternation of a setting for a replacement time indicative of when a maintenance part etc. of the vehicle is due for replacement.

Such a demand may be met by changing a program for the controller mounted on the vehicle, but, this method is not suitable for mass production. Therefore, one method is usually taken, in which various control parameters etc. are stored in a nonvolatile ROM and an adjuster (service man) rewrites them, using a personal computer or the like.

Apart from the alternation of the vehicle body performance described above, adjustment and setting items (e.g., monitor screen brightness adjustment and liquid crystal contrast adjustment) associated with convenience and comfortability for the operator in operating the vehicle are adjusted by the operator's turning an exclusive switch provided for each item.

It has, however, been found that the operation for the adjustment, in which the adjuster changes vehicle body performance by rewriting by use of a tool such as computers, is extremely troublesome. In addition, the adjustment made by the operator's turning the exclusive switch provided for every adjustment or setting item also presents the problem that the number of switches increases as the number of adjustment/setting items increases, which results in not only troublesome adjustment/setting operations but also a complicated structure of the operation panel.

The invention is directed to overcoming the above problems and a primary object of the invention is therefore to provide a monitor system for a work vehicle, wherein adjustment and setting operations carried out by a service man having a good knowledge of the vehicle and adjustment and setting operations carried out by an operator are executed on the same monitor panel surface and wherein various adjustment and setting operations can be easily carried out in compliance with the operator's taste while various adjustment and setting operations on the service side can be readily carried out without use of a special input device.

DISCLOSURE OF THE INVENTION

The above object can be accomplished by a monitor system for a work vehicle, the monitor system comprising a display panel section for displaying various items of information on the work vehicle and a switching and adjustment switch section for executing various switching and adjustment operations including switching of the display content of the display panel section, wherein the display panel section includes a message display section for displaying, by switching, various messages, the message displaying section being switchable among a normal mode for displaying the normal operating condition of the work vehicle; a user information mode for displaying, by switching, a plurality of functions selectable by an operator who operates the work vehicle; and a service information mode for displaying, by switching, a plurality of functions selectable by an adjuster who is in charge of adjustment operation for the work vehicle.

According to the invention, since the adjustment and setting operations carried out by the services man having a good knowledge of the vehicle and the adjustment and setting operations carried out by the operator are executed on the same display panel surface, so that not only various adjustment and setting operations on the service side such as vehicle performance adjustment can be readily carried out without use of a special input device, but also various adjustment and setting operations for improving convenience and comfortability for the operator can be readily carried out according to the operator's taste. In addition, the number of switches etc. does not increase as the number of adjustment items increase, so that a simplified system configuration can be achieved for the monitor system.

Preferably, in the present invention, the user information mode has a maintenance mode for displaying maintenance information on the work vehicle or a user adjustment mode for setting and adjusting the visibility of the display panel section. Displaying of the maintenance information allows the operator to readily grasp a replacement time indicative of, for instance, when the oil filter or oil is due for replacement, which provides more convenience. Further, the visibility of the display panel section can be readily adjusted in accordance with the operator's taste so that comfortability when the operator is driving the vehicle can be improved.

Preferably, in the maintenance mode, a maintenance item, a maintenance time and a maintenance history are displayed.

Further, it is preferable that the brightness and strength of a backlight for the display panel section be adjusted in the user adjustment mode.

In the invention, the service information mode preferably has a maintenance service mode for altering a setting for a maintenance time displayed in the maintenance mode; a load memory mode for storing and displaying the load condition of the vehicle; or a real time monitoring mode for displaying the present operating condition of the vehicle. The provision of the maintenance service mode allows alteration of a setting for a maintenance time for each individual vehicle according to its operating site, so that a vehicle which satisfies user's needs can be attained. Additionally, the provision of the real time monitoring mode allows the service man to know the continually changing condition of the vehicle in real time, which further facilitates operations such as adjustment and setting.

In this case, the real time monitoring mode is preferably designed to display the operating condition of the item corresponding to an identification code which has been input, being selected from identification codes preset for display items respectively. With this arrangement, the item corresponding to an identification code which has been input can be immediately selected from many display items. This results in an improvement in the efficiency of the operation carried out by the service man.

DETAILED DESCRIPTION OF THE INVENTION

Figure 1:
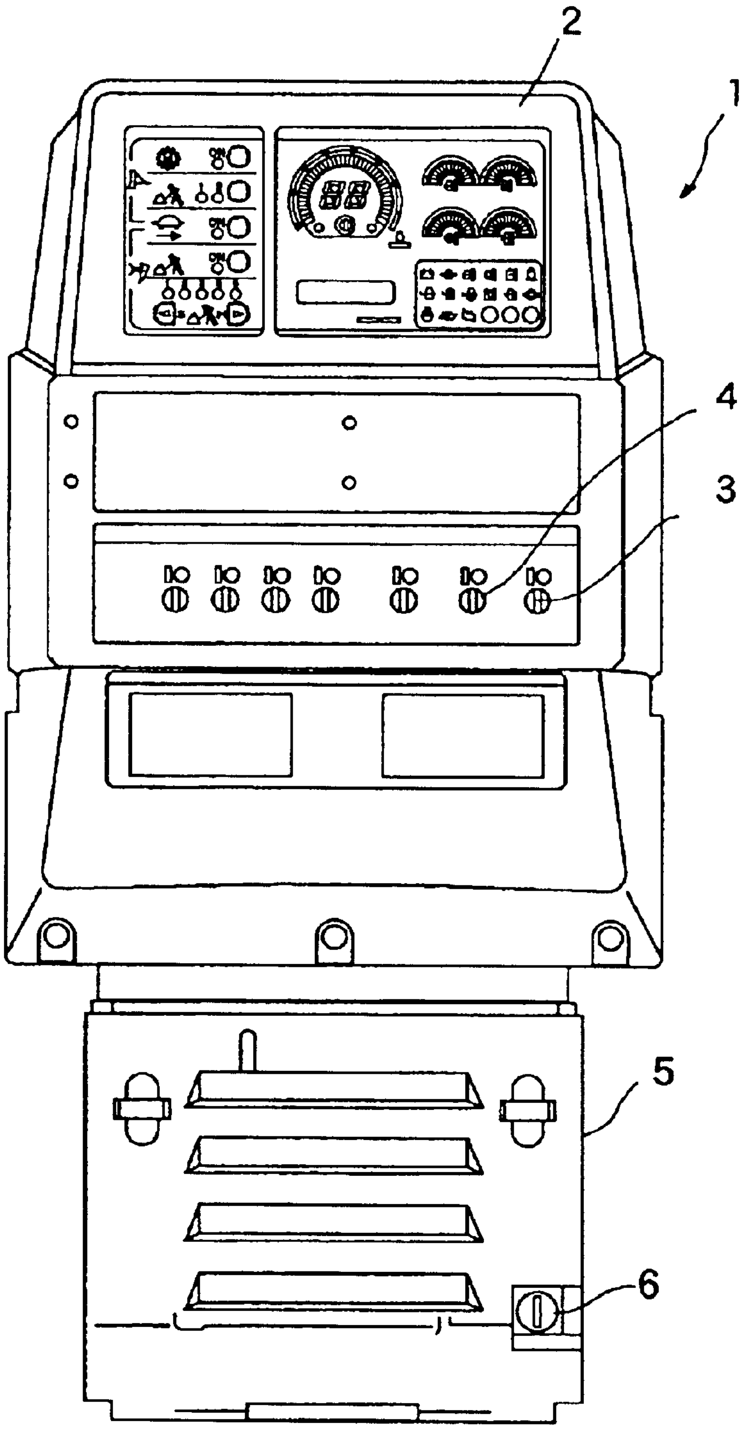
FIG. 1 is a front view of a monitor system with its cover opened, according to one embodiment of the invention.

The present invention is not limited to the following detailed description of the best mode embodiment. To the contrary, the present invention includes all other embodiments and alternatives as may fall within the scope of the appended claims.

Referring now to the drawings, a monitor system for a work vehicle will be explained according to a preferred embodiment of the invention.

FIG. 1 shows a front elevation of a monitor system applied to a bulldozer according to one embodiment of the invention, when the monitor system is in its cover-opened condition.

The monitor system 1 of the present embodiment is installed in front of the operator's seat of the bulldozer and comprised of: a monitor panel (display panel section) 2 of a touch-panel type; and various switches such as a selector switch 3 and a cursor switch 4 which are disposed under the monitor panel 2. A service switch 6 is provided at a position under these switches, the position being inaccessible by an ordinary operator, in other words, being the inside of a cover 5 operable only by an adjuster (service man). The selector switch 3, the cursor switch 4 and others are each composed of a rotatable control which is operated by turning rightward or leftward by about 30 degrees and is returned to the center position by a spring whenever it is released from the operator's hold after turning operation. The selector switch 3 is designed such that various modes (described later) can be selectively determined by continually turning it in a left turn direction and these modes can be cancelled by turning it in a right turn direction by about 30 degrees. The cursor switch 4 is designed to switch the monitor system to various modes or move a cursor displayed in a display section to the right or left by turning it in a right turn direction or a left turn direction.

Figure 2:
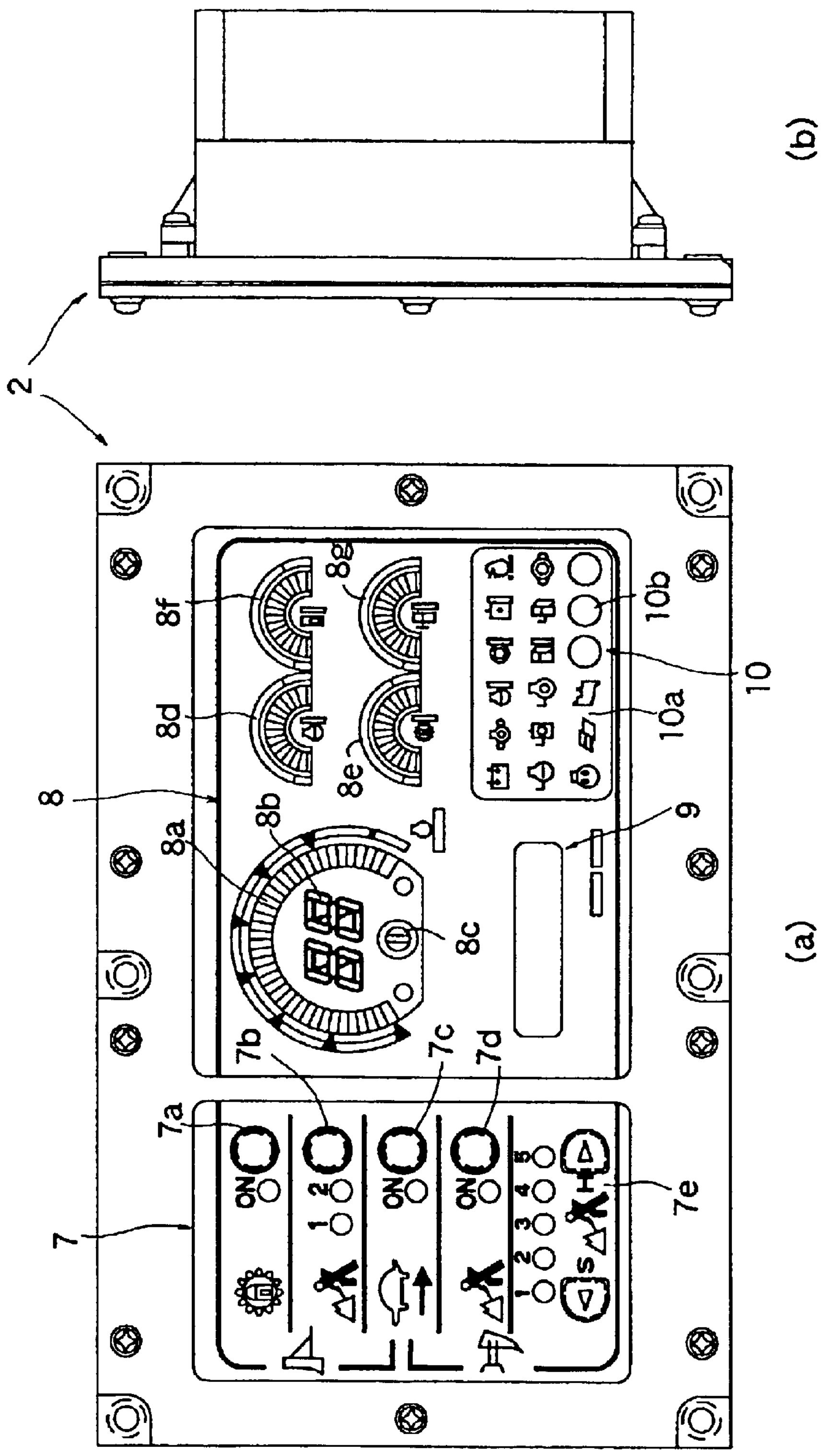
FIGS. 2(*a*) and 2(*b*) are a front elevation and side elevation, respectively, of a monitor panel.

As shown in FIG. 2, the monitor panel 2 has a shoe slip control switch section 7 at its left part; a gauge display section 8 at its upper center and upper right parts; a message display section 9 at its lower center part; and a caution display section 10 at its lower right part. The shoe slip control switch section 7 includes: a lock-up switch 7*a*; an economy switch 7*b*; a reverse drive slow switch 7*c*; a shoe slip control switch 7*d*; and a shoe slip mode switch 7*e*. The gauge display section 8 comprises: a tachometer 8*a*; a speed range display 8*b*; a lock-up display 8*c*; an engine water temperature gauge 8*d*; a power line oil temperature gauge 8*e*; a hydraulic oil temperature gauge 8*f*; and a fuel gauge 8*g*. The caution display section 10 comprises: various marks 10*a* which respectively light when an abnormality (e.g. a battery charge abnormality; a drop in engine oil pressure; engine overheat; power line oil overheat; hydraulic oil pressure overheat; a drop in the level of coolant water; and a drop in HSS charge pressure) occurs, and display lamps 10*b* which respectively light or flicker simultaneously with lighting of the marks 10*a*.

Figure 3:
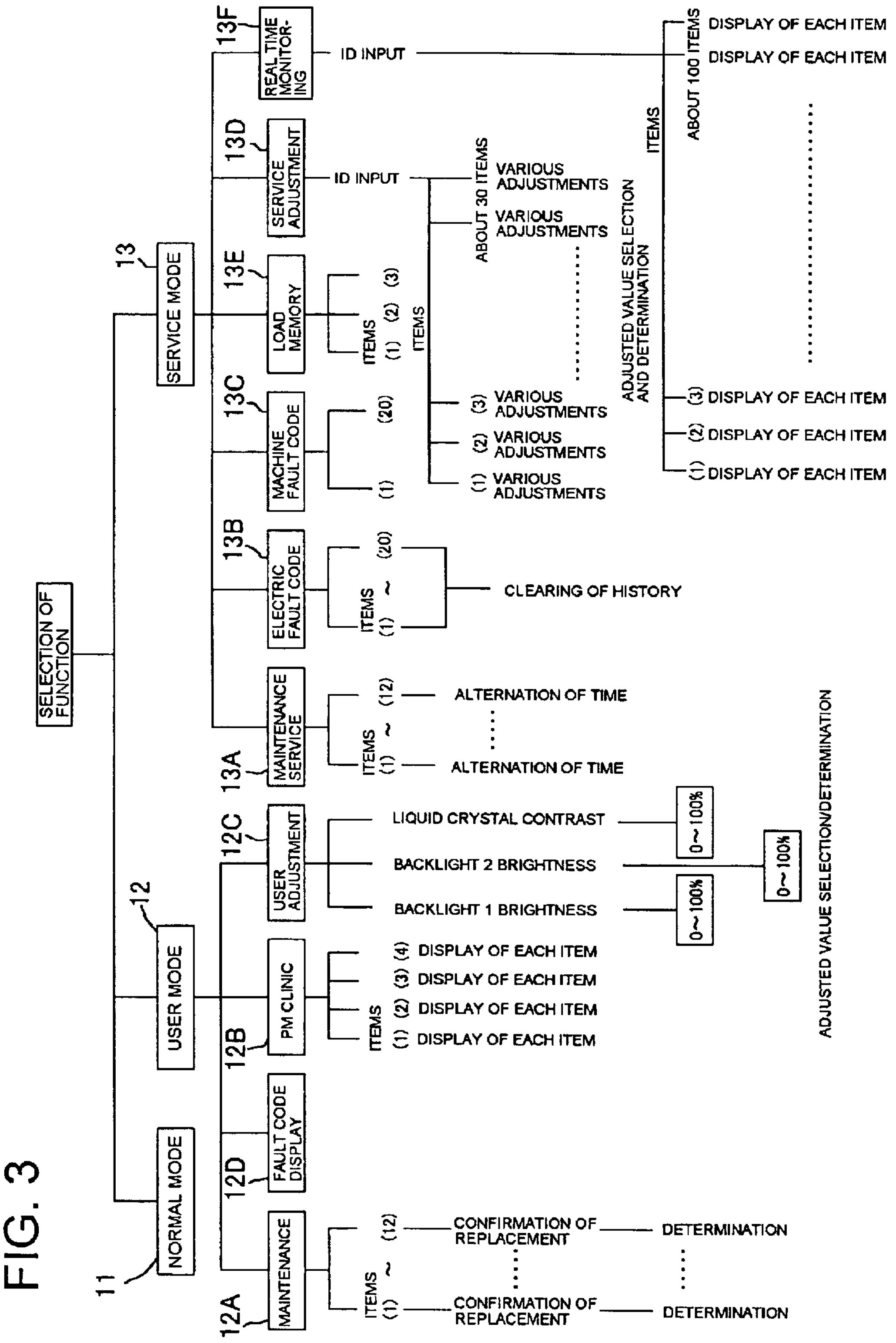
FIG. 3 is a mode transition tree of a message display section.

Next, the configuration of the message display section 9 will be described in detail. As shown in the mode transition tree of FIG. 3, the message display section 9 displays one mode selected by a function selection from three modes which are a normal mode (standard mode) 11; a user information mode (user mode) 12; and a service information mode (service mode) 13. The user mode 12 is for making an adjustment or setting in order to provide more convenience and comfortability for the operator when he is driving the bulldozer. The service mode 13 is for making an adjustment or setting which cannot be made by the operator but can be made by the service man to change the vehicle body performance of each individual vehicle according to its operating site.

Figure 4:
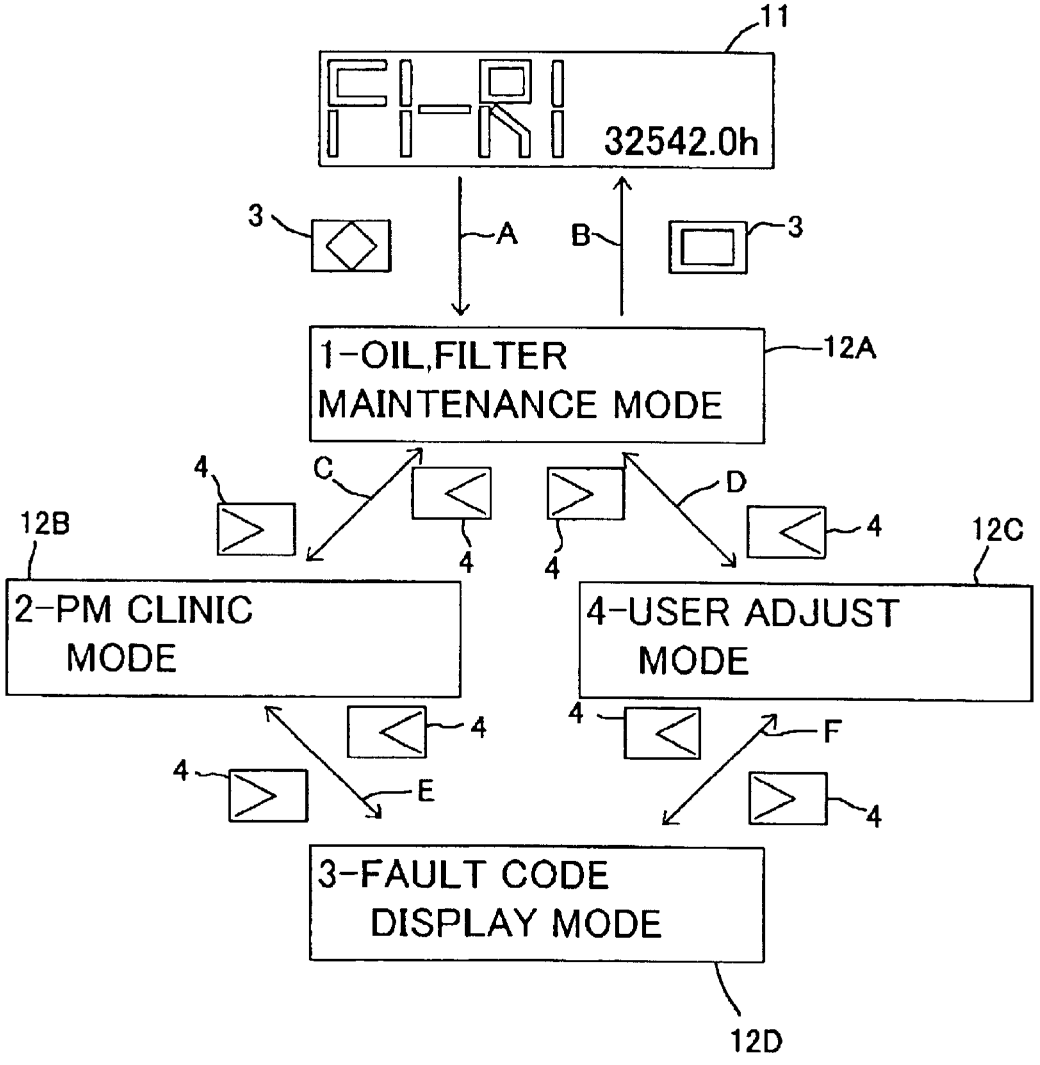
FIG. 4 is an explanatory diagram showing a switching condition from a normal mode to a user mode.

In the normal mode 11, the message display section 9 displays, as shown in FIG. 4, a speed range (represented by F1–R1 in the example shown in FIG. 4) and an accumulated operating time (represented by 32542.0h in the example shown in FIG. 4) side by side. For changing the display content of the message display section 9 from the normal mode 11 to the user mode 12, the selector switch 3 is turned in a left turn direction for a specified period of time (e.g., 2.5 seconds) so that the display content of the message display section 9 is switched to a maintenance mode (for displaying a replacement time for the oil filter or oil) 12A of the user mode 12 as indicated by arrow A. When turning the selector switch 3 in a right turn direction from the maintenance mode 12 A, the selector switch 3 works as a cancel switch so that the display section 9 returns to the normal mode 11 as indicated by arrow B.

When turning the cursor switch 4 in a right turn direction from the maintenance mode 12A, the maintenance mode 12A is switched as indicated by arrow C to a PM clinic mode (which is for displaying the rotation of the engine and the hydraulic pressure of the implement circuit) 12B. When turning the cursor switch 4 in a left turn direction from the PM clinic mode 12B, the display content of the message display section 9 returns to the maintenance mode 12A again. In this case, after a mode is altered by operating the cursor switch 4, the mode after the alteration can be determined by operating the selector switch 3 (this is also applied to the following operations).

When turning the cursor switch 4 in a left turn direction from the maintenance mode 12A, the maintenance mode 12A is switched as indicated by arrow D to the user adjustment mode (which is for adjusting the brightness of the display etc.) 12C. When turning the cursor switch 4 in a right turn direction from the user adjustment mode 12C, the display content of the message display section 9 again returns to the maintenance mode 12A.

When turning the cursor switch 4 in a right turn direction from the PM clinic mode 12B (or turning the cursor switch 4 in a left turn direction from the user adjustment mode 12C), the PM clinic mode 12B or user adjustment mode 12C is switched as indicated by arrows E, F to a fault code display mode (which is for displaying a fault code associated with electronic control) 12D. By turning the cursor switch 4 in a left turn or right turn direction from the fault code display mode 12D, the display content of the message display section 9 again returns to the PM clinic mode 12B (or the user adjustment mode 12C).

The maintenance mode 12A, PM clinic mode 12B, user adjustment mode 12C and fault code display mode 12D of the user mode 12 will be respectively described in details.

(I) Maintenance Mode 12A

In the maintenance mode 12A, one of the following twelve display items can be selected by turning the cursor switch 4 and confirmation for replacement of the respective items can be done.

Figure 5:
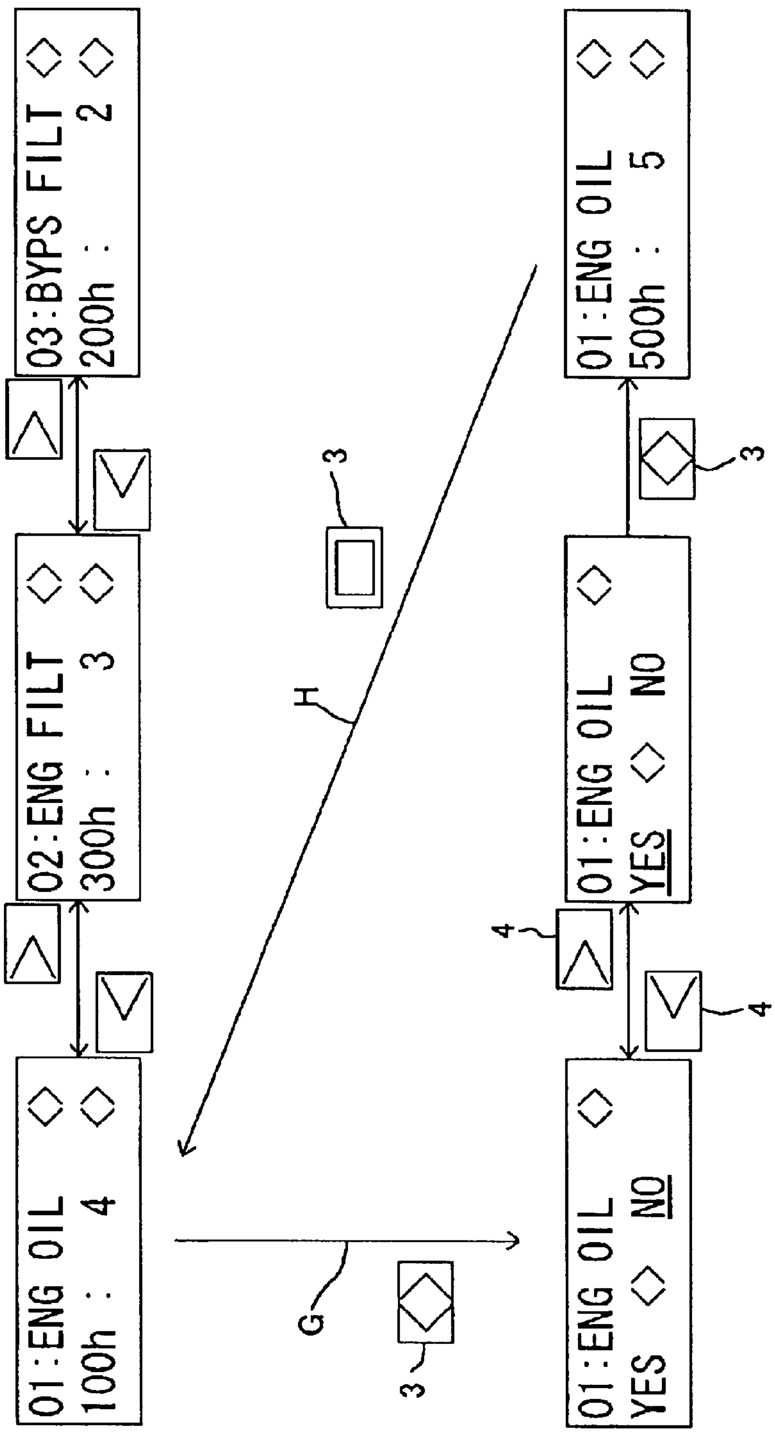
FIG. 5 is an explanatory diagram showing a display item switching condition in a maintenance mode.

(1) engine oil; (2) engine oil filter; (3) bypass filter; (4) fuel filter; (5) corrosion register; (6) power line oil; (7) power line oil filter; (8) hydraulic oil; (9) hydraulic oil filter; (10) HSS charge filter; (11) damper oil; (12) final drive oil FIG. 5 shows a sequential selection of the display items listed above. In FIG. 5, the time remaining before each item is due for replacement and the number of replacements which have been done are shown in the lower row of each display item (for example, "100 h: 4" is shown in the display item "engine oil"). By turning the selector switch 3 after selection of a display item, a question as to whether or not the replacement history needs to be updated is displayed on the display screen. More concretely, if the selector switch 3 is operated while the display item "engine oil" being selected, a display screen which asks whether the replacement history "engine oil" needs to be updated (Yes) or not (No) appears. If "Yes" is selected on this screen by operating the cursor switch 4 and the selector switch 3 is turned, the number of replacements is incremented by one (4→5) and the remaining time before the engine oil is due for replacement is reset. If the selector switch 3 is operated in a reverse direction when this display screen appears, the display content of the message display section 9 returns to a function selection mode as indicated by arrow H.

(II) PM Clinic Mode 12B

Figure 6:
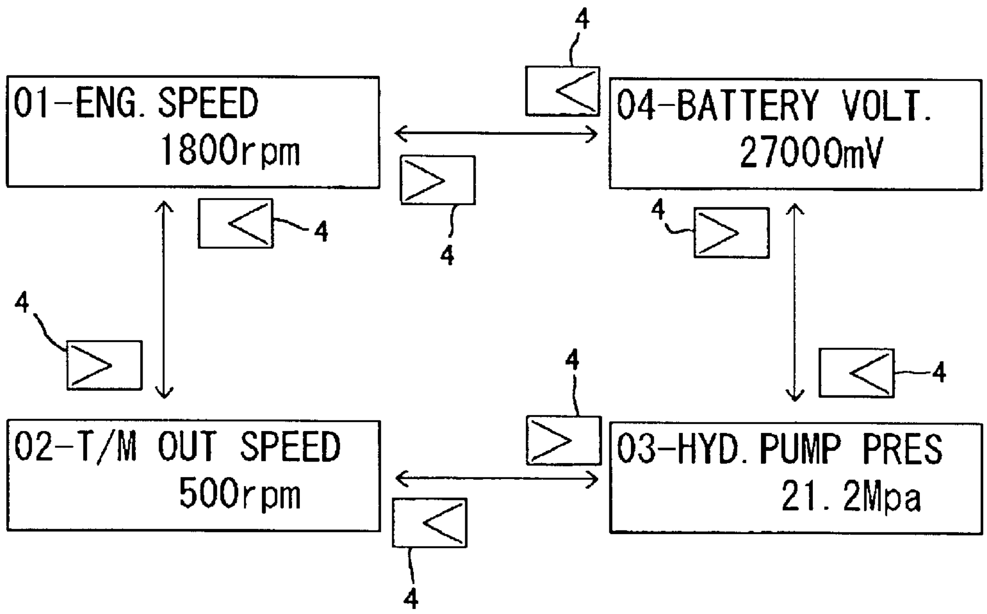
FIG. 6 is an explanatory diagram showing a display item switching condition in a PM clinic mode.

In the PM clinic mode 12B, a plurality of items can be selectively displayed as shown in FIG. 6 by turning the cursor switch 4. For instance, the following four display items can be consecutively selected.

(1) engine rotational speed; (2) battery voltage; (3) rotational speed of transmission output (4) hydraulic pressure of implement oil circuit Taking account of such a case that the figure of each display item is difficult to read because of fluctuation during measurement, the system is provided with a function (display holding function) in which by operating the selector switch 3 in the case of figure fluctuation, the value of a display item at the instant the selector switch 3 is operated can be brought to a standstill for displaying.

(III) User Adjustment Mode 12C

Figure 7:
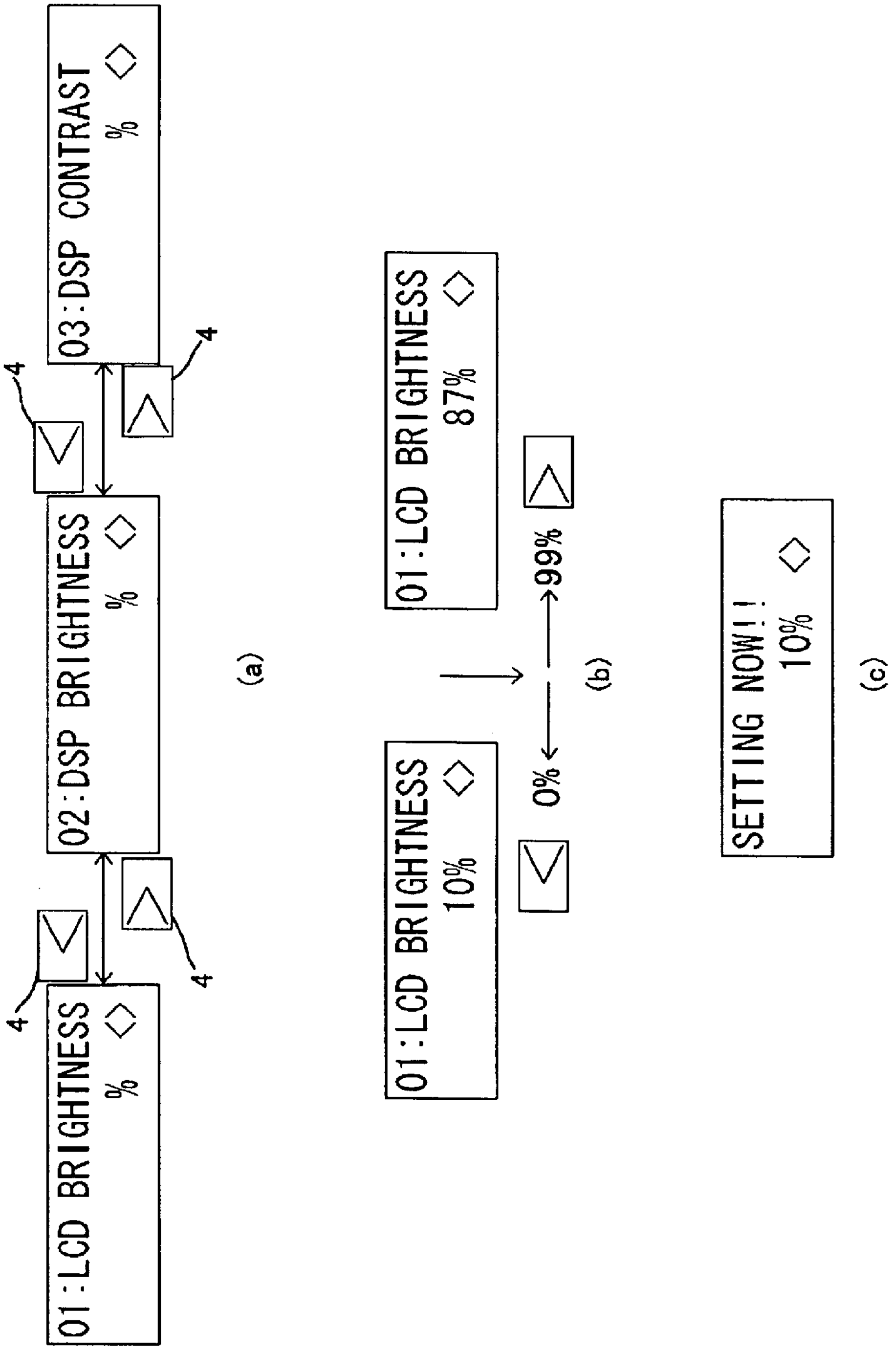
FIG. 7 is an explanatory diagram showing a display item switching condition in a user adjustment mode.

In the user adjustment mode 12C, the level (brightness and contrast) of the liquid crystal backlight of the monitor panel 2 is controlled by turning the cursor switch 4, as shown in FIG. 7. Concretely, as shown in FIG. 7(*a*), any one of the following levels is adjustable: the brightness of the backlight of the gauge display section 8 (LCD BRIGHTNESS); the brightness of the backlight of the message display section 9 (DSP BRIGHTNESS); and the contrast of the liquid crystal of the message display section 9 (DSP CONTRAST). In this case, after mode determination, the level of the brightness can be increased or decreased within the range of 0% to 100% as shown in FIG. 7(*b*) by turning the cursor switch 4. By turning the selector switch 3 after the brightness level adjustment, "SETTING NOW !!" is displayed as shown in FIG. 7(*c*) and the level of the brightness is determined.

(IV) Fault Code Display Mode 12D

Figure 8:
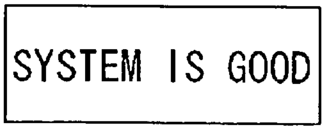
FIG. 8 is an explanatory diagram showing a display item switching condition in a fault code display mode.
Figure 8:
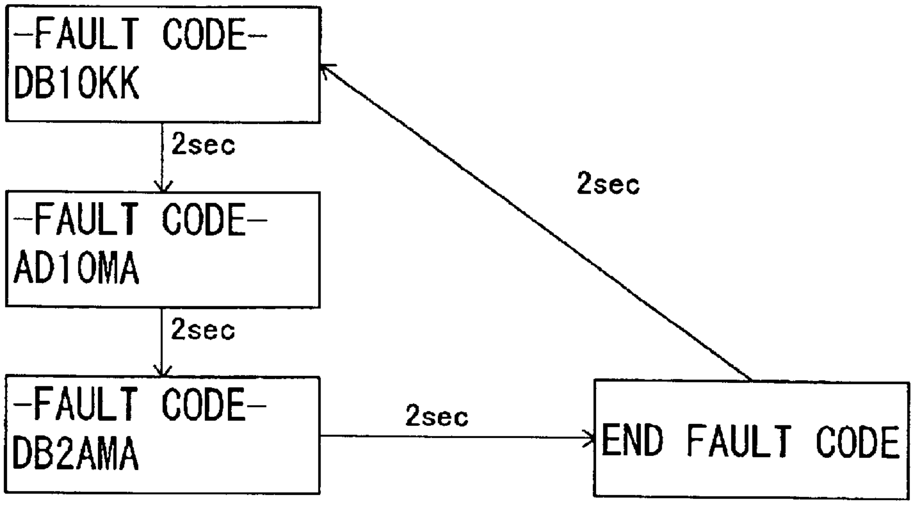

In the fault code display mode 12D, disconnection of a sensor, short circuit, or the like is detected to display a mode for the fault part by a code.

Where no fault has occurred, "SYSTEM IS GOOD" is displayed as shown in FIG. 8(*a*), indicating that the vehicle body system has no abnormality. On the other hand, where a fault has occurred, a fault code composed of six digits (e.g., DB10KK, AD10MA, etc.) is automatically fed at intervals of two seconds as shown in FIG. 8(*b*).

Figure 9:
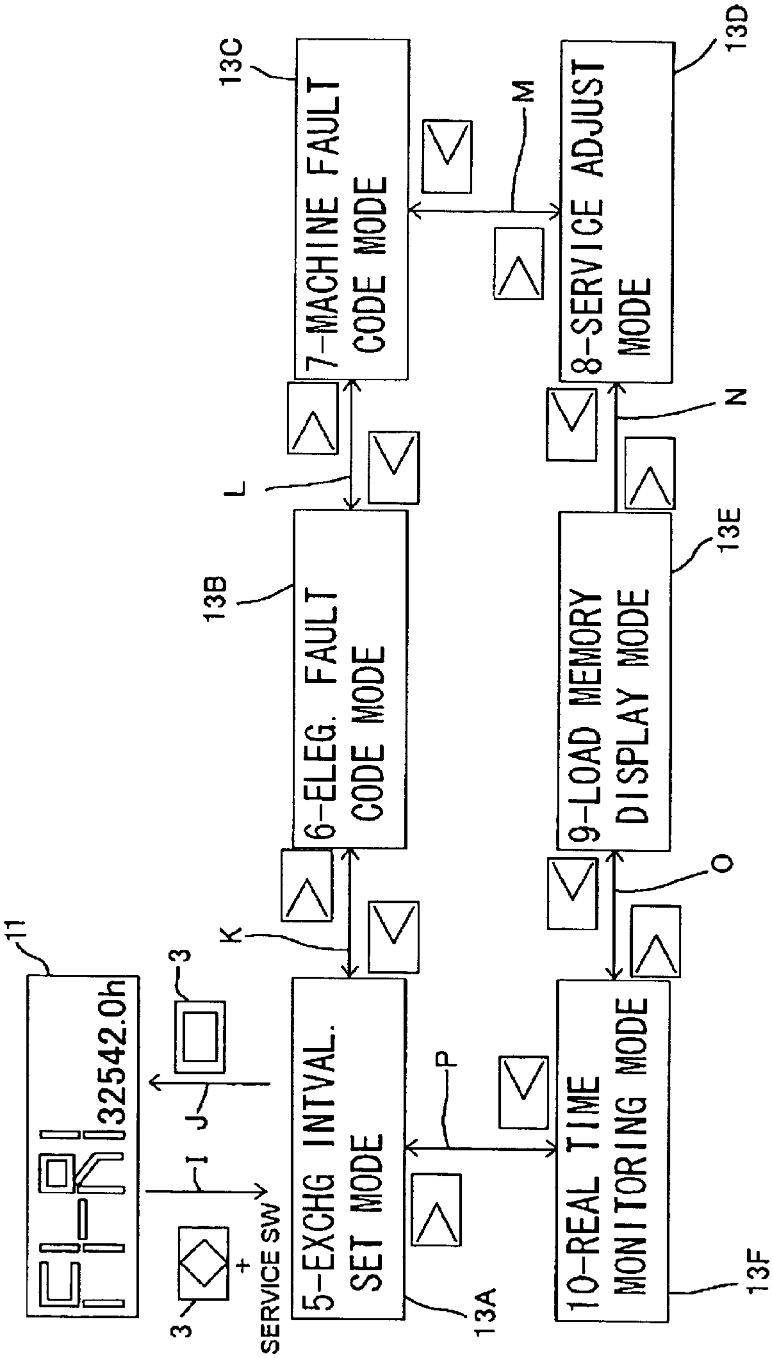
FIG. 9 is an explanatory diagram showing a switching condition from the normal mode to a service mode.

As compared with the above-described user mode 12, for a shift from the normal mode 11 to the service mode 13, the selector switch 3 is turned leftward for a specified time (e.g., 2.5 sec.) when the service switch 6 is in its operated condition, so that the display content of the message display section 9 is switched to a maintenance service mode 13A of the service mode 13, as indicated by arrow I of FIG. 9. When turning the selector switch 3 in a right turn direction from the maintenance service mode 13A, the selector switch 3 acts as a cancel switch so that the display content of the message display section 9 returns to the normal mode 11 as indicated by arrow J.

When continuously turning the cursor switch 4 in a right turn direction from the maintenance service mode 13A, the display content of the message display section 9 is sequentially switched to an electric fault code mode 13B (arrow K), a machine fault code mode 13C (arrow L), a service adjustment mode 13D (arrow M), a load memory display mode 13E (arrow N), and a real time monitoring mode 13F (arrow O). By further turning the cursor switch 4 in a right turn direction, the display content of the message display section 9 returns to the maintenance service mode 13A (arrow P). It should be noted that by turning the cursor switch 4 in a left turn direction from each mode, the display content returns to the mode just before the former mode.

Next, the maintenance service mode 13A, electric fault code mode 13B, machine fault code mode 13C, service adjustment mode 13D, load memory mode 13E and real time monitoring mode 13 F of the service mode 13 will be respectively explained in detail.

(I) Maintenance Service Mode 13A

The maintenance service mode 13A is for changing the service time of the maintenance mode 12A of the user mode 12. In the maintenance service mode 13A, a setting for a replacement time for each display item can be altered after one of the twelve display items of the maintenance mode 12A has been selected by turning the cursor switch 4.

Figure 10:
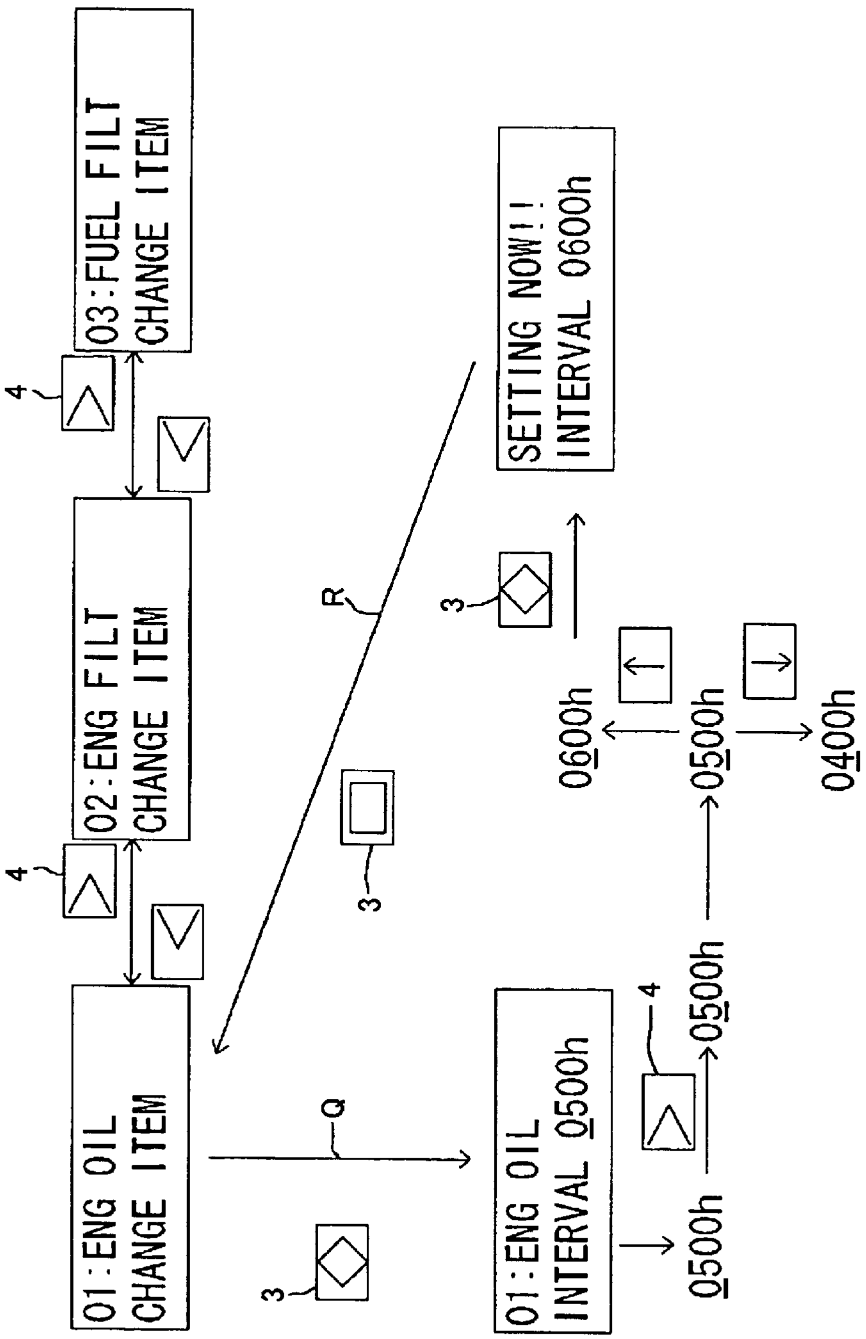
FIG. 10 is an explanatory diagram showing a display item switching condition in a maintenance service mode.

FIG. 10 shows the manner of a consecutive selection of the above display items. As shown in the drawing, selection of each display item such as engine oil and engine oil filter is done by cursor switch 4. After a display item has been determined, the operation screen for setting time alteration is allowed to appear by turning the selector switch 3. Specifically, if the selector switch 3 is operated when the display item "engine oil" is selected, the display screen for altering the replacement intervals for engine oil appears as indicated by arrow Q. In this display screen, the cursor (under-bar position) is positioned on the desired figure to be changed, using the cursor switch 4 and then, the figure is altered by turning a shift-up and shift-down switch (not shown). When the selector switch 3 is subsequently turned, "SETTING NOW !!" appears while the replacement intervals (600h) after the setting are displayed. Thus, the altering operation is completed. If the selector switch 3 is reversely turned from this display screen, the display content of the message display section 9 returns to the function selection mode as indicated by arrow R.

(II) Electric Fault Code Mode 13B

Figure 11:
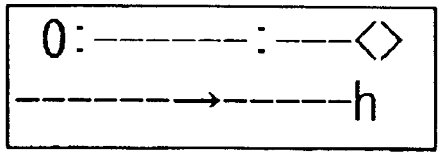
FIG. 11 is an explanatory diagram showing a display item switching condition in an electric fault display mode.
Figure 11:
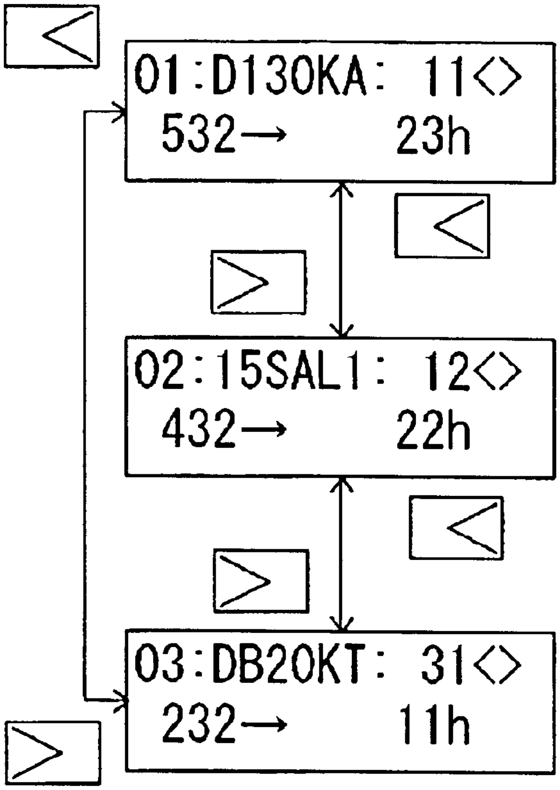

The electric fault code mode 13B is for displaying and clearing a fault code associated with the electric system. If no fault has occurred, the display items "error code", "the number of error occurrences" and "the time elapsed after an error occurrence" are all blank. On the other hand, if a fault has occurred, an error code composed of six digits (e.g., D130KA and 15SAL1), the number of error occurrences (e.g., 11, 12, 31 and so on), the time elapsed after the occurrence of the oldest error (532, 432, 232 and so on) and the time elapsed after the occurrence of the latest error (23 h, 22 h, 11 h and so on) are displayed as shown in FIG. 11(*b*).

(III) Machine Fault Code Mode 13C

The machine fault code mode 13C is for displaying a fault code associated with the vehicle body such as overheat and abnormal water temperature. Like the electric fault code mode 13B, an error code, the number of error occurrences, the time elapsed after the occurrence of the oldest error, the time elapsed after the occurrence of the latest error are displayed in the machine fault code mode 13C (not shown in the drawings).

(IV) Service Adjustment Mode 13D

The service adjustment mode 13D is an adjustment mode for carrying out setting of a machine type for the controller and fine adjustments of the neutral voltages of the levers. Although not shown in the drawings, this mode 13D is concerned with various adjustments such as brake potentio neutral voltage value adjustment, neutral adjustment (straight-ahead driving adjustment) of the HSS steering, and lever position adjustment at a start of turning the HSS steering. An explanation on the details of each adjustment mode is omitted herein. In the service adjustment mode 13D, direct retrieval of the desired display item can be done by directly inputting an identification code preset for each display item. With this arrangement, an erroneous selection and adjustment of an adjustment item can be avoided and the identification code is allowed to function as a password.

(V) Load Memory Display Mode 13E

Figure 12:
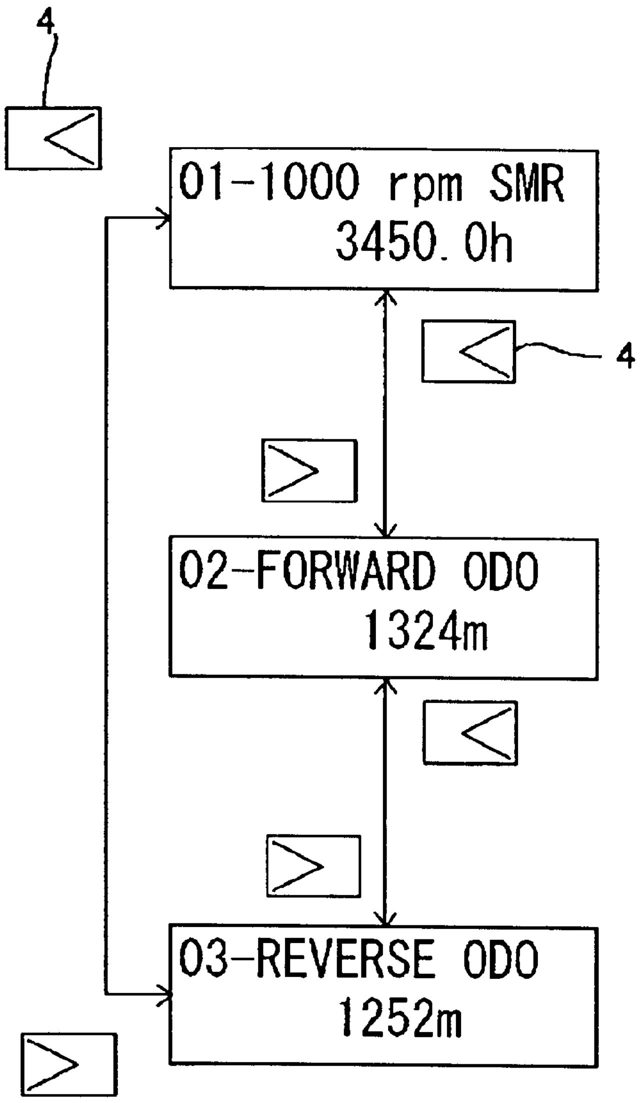
FIG. 12 is an explanatory diagram showing a display item switching condition in a load memory mode.

The load memory display mode 13E is for storing and displaying information on the odometer and the load imposed on the vehicle body. One of the display items can be selected by operating the cursor switch 4, the display items including a 1000 rpm service meter (a meter which counts engine rotation only when it is 1000 rpm or more) shown in the upper row of FIG. 12; a vehicle forward drive odometer (a meter for indicating accumulated distance traveled in forward drive) shown in the intermediate row of FIG. 12; and a vehicle reverse drive odometer (a meter for indicating accumulated distance traveled in reverse drive) shown in the lower row of FIG. 12.

(VI) Real Time Monitoring Mode 13F

The real time monitoring mode 13F is for displaying the output values of sensors provided for the vehicle body and hydraulic pressure. The real time monitoring mode 13F is arranged to display various present conditions associated with the vehicle such as engine rotation, the opening of the accelerator, HSS hydraulic pressure, engine water temperature and theoretical vehicle speed through the sensors connected to the controller mounted on the vehicle body. In the real time monitoring mode 13F, a desired display item can be directly retrieved by directly inputting one of identification codes preset for the respective display items, similarly to the service adjustment mode 13D. One example of the input is shown in FIG. 13.

Figure 13:
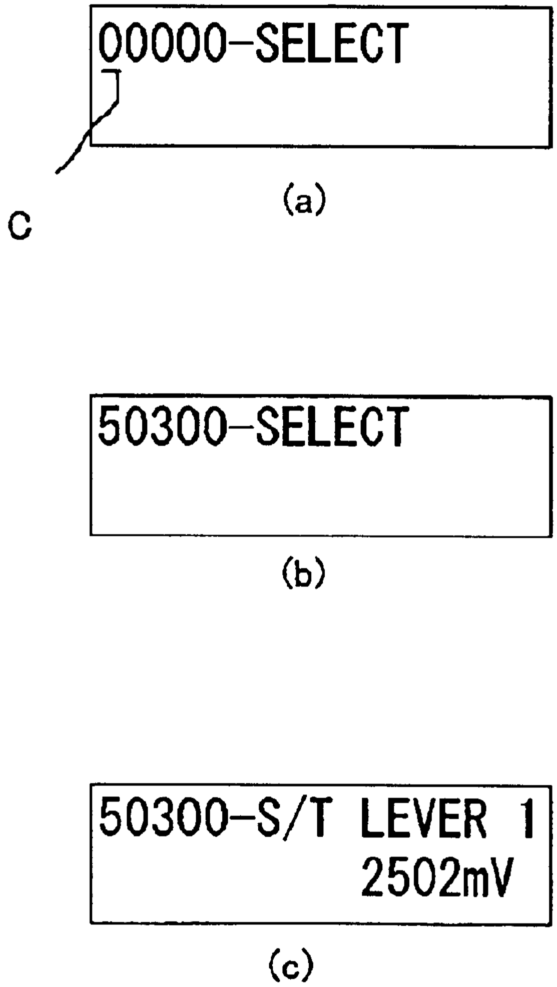
FIG. 13 is an explanatory diagram showing a display item switching condition in a real time monitoring mode.

The example shown in FIG. 13 is associated with a method for selecting a voltage value for a steering lever 1 having identification No. 50300. In this method, when inputting the identification No., one desired figure is selected by operating the shift-up and shift-down switch (not shown) at the position of the flickering cursor c as shown in FIG. 13(*a*). Shifting is then carried out with the cursor switch 4 to sequentially input the figures. After completion of inputting as shown in FIG. 13(*b*), the selector switch 3 is turned thereby determining the figures. Thereafter, the display item (S/T LEVER 1) and a voltage value (2502 mV) are displayed as shown in FIG. 13(*c*). This mode is provided with the display holding function, taking account of the case where the figure representing, for instance, the rotational speed of the engine is difficult to read because of fluctuation during measurement. According to the function, if figure fluctuation occurs, the selector switch 3 is operated and the figure at the instant the selector switch 3 is operated is brought to a standstill for displaying.

In the real time monitoring mode 13F, the item corresponding to an input identification code can be immediately selected for displaying from a number of display items so that improved efficiency can be accomplished for display item selection.

What is claimed is:

1. A monitor system for a work vehicle, the monitor system comprising a display panel section for displaying various items of information on the work vehicle and a switching and adjustment switch section for executing various switching and adjustment operations including switching of the display content of the display panel section, wherein the display panel section includes a message display section for displaying, by switching, various messages, the message displaying section being switchable among a normal mode for displaying the normal operating condition of the work vehicle; a user information mode for displaying, by switching, a plurality of functions selectable by an operator who operates the work vehicle; and a service information mode for displaying, by switching, a plurality of functions selectable by an adjuster who is in charge of adjustment operation for the work vehicles wherein the user information mode has a maintenance mode, in which a maintenance item, a maintenance time and a maintenance history are displayed.

2. The monitor system for a work vehicle according to claim 1, wherein the maintenance mode displays maintenance information on the work vehicle or a user adjustment mode for setting and adjusting the visibility of the display panel section.

3. The monitor system for a work vehicle according to claim 2, wherein, in the user adjustment mode, the brightness and contrast of backlight for the display panel section can be adjusted.

4. The monitor system for a work vehicle according to claim 2, wherein the service information mode has a maintenance service mode for altering a setting for the maintenance time displayed in the maintenance mode.

5. The monitor system for a work vehicle according to claim 2, wherein a load memory for storing and displaying the load condition of the vehicle.

6. The monitor system for a work vehicle according to claim 2, wherein a real time monitoring mode for displaying the present operating condition of the vehicle.

7. The monitor system for a work vehicle according to claim 6, wherein the real time monitoring mode is designed to display the operating condition of the item corresponding to an identification code which has been input, being selected from identification codes preset for display items.

* * * * *